United States Patent [19]

Ward

[11] 4,190,553

[45] Feb. 26, 1980

[54] REJUVENATION OF DAMAGED ZEOLITE-SUPPORTED METAL CATALYSTS

[75] Inventor: John W. Ward, Yorba Linda, Calif.

[73] Assignee: Union Oil Company of California, Los Angeles, Calif.

[21] Appl. No.: 948,890

[22] Filed: Oct. 5, 1978

Related U.S. Application Data

[63] Continuation-in-part of Ser. No. 470,868, May 17, 1974, abandoned.

[51] Int. Cl.$^2$ .................. B01J 29/38; B01J 29/12; B01J 29/22; C10G 13/10
[52] U.S. Cl. .................................. 252/412; 208/111; 252/413; 252/416; 252/455 Z
[58] Field of Search ............... 252/412, 413, 455 Z, 252/416; 208/111

[56] References Cited

U.S. PATENT DOCUMENTS

| | | | |
|---|---|---|---|
| 3,210,267 | 10/1965 | Plank et al. | 208/120 |
| 3,373,110 | 3/1968 | Chen | 252/455 Z |
| 3,375,065 | 3/1968 | McDaniel et al. | 252/455 Z |
| 3,392,124 | 7/1968 | Laurent | 208/120 |
| 3,442,794 | 5/1969 | Van Helden et al. | 208/111 |
| 3,449,070 | 6/1969 | McDaniel et al. | 252/455 Z |
| 3,457,191 | 7/1969 | Erickson et al. | 252/455 Z |
| 3,493,490 | 2/1970 | Plank et al. | 252/412 |
| 3,684,738 | 8/1972 | Chen | 252/412 |
| 3,692,692 | 9/1972 | Ward et al. | 252/412 |
| 4,055,482 | 10/1977 | Robson | 208/111 |

*Primary Examiner*—P. E. Konopka
*Attorney, Agent, or Firm*—Gregory F. Wirzbicki; Dean Sandford; Lannas S. Henderson

[57] ABSTRACT

Siliceous zeolite catalysts comprising zeolitic mono- and/or divalent metal cations and a non-zeolitic Group VIII noble metal hydrogenating component supported thereon, which catalysts have undergone damage by thermal and/or hydrothermal stresses resulting in a maldistribution of the metal components, are rejuvenated in activity by a first treatment with a volumetric excess of aqueous ammonium hydroxide, followed by a second treatment with an extractive proportion of an aqueous ammonium salt solution. The combined treatments have a twofold effect of bringing about a desirable redistribution of the Group VIII noble metal, and of exchanging out at least a portion of undesired zeolitic mono- and/or divalent metal ions. A highly advantageous procedure for carrying out the rejuvenation involves simply neutralizing the ammonium hydroxide-catalyst mixture from the first treatment with a suitable acid to give the ammonium salt desired for the second treatment.

12 Claims, No Drawings

REJUVENATION OF DAMAGED ZEOLITE-SUPPORTED METAL CATALYSTS

RELATED APPLICATIONS

This application is a continuation-in-part of Ser. No. 470,868, filed May 17, 1974, now abandoned.

BACKGROUND AND SUMMARY OF THE INVENTION

It is well known that maximum activity of the Group VIII noble metals for hydrogenation reactions depends upon maintaining the metal in a finely divided state such that there is a maximum ratio of surface area to mass. Perhaps the most common method of achieving a high degree of dispersion involves impregnation salts of the Group VIII noble metals upon porous solid supports, followed by drying and decomposing of the impregnated salt. On non-zeolitic supports, the drying and calcining operations often bring about a substantial migration and agglomeration of the impregnated metal, with resultant reduction in activity. In more recent years, with the advent of highly active crystalline zeolite catalysts of the aluminosilicate type, it has become common practice to ion-exchange the desired metal salt into the zeolite structure in an attempt to achieve an initial ionic bond between each metal atom and an exchange site on the zeolite, thus achieving the ultimate in dispersion of metal while also bonding the metal to the zeolite in such manner as to minimize migration and agglomeration during the drying and calcining steps, in which at least a portion of the metal is oxidized and converted to a non-zeolitic form. This ion exchange technique is particularly desirable in the case of dual-function catalysts such as hydrocracking catalysts wherein it is desirable to maintain an active hydrogenating site closely adjacent to an acid cracking site. These efforts have met with varying degrees of success.

Even though the above described ion-exchange techniques can give a high degree of initial dispersion of the Group VIII noble metal on the support, conditions encountered during subsequent use of the catalyst may bring about a maldistribution of the metal with resultant reduction in activity, entirely independent of normal deactivating phenomena such as coking, fouling, poisoning, etc. Overheating, or contact with excessive partial pressures of water vapor at high temperatures, such as may occur during oxidative regeneration of the catalyst or during prolonged contacting with hydrocarbon feedstocks, may bring about migration of the active metal away from the exchange sites, and this migration may ultimately result in agglomeration of the metal, or at least migration to sites unavailable to feed molecules.

Migration and agglomeration are most apt to occur when the catalyst, in a sulfided condition (as e.g., in normal use for hydrocracking), or in an oxidized state (as during regeneration), comes into contact for more than about 30 minutes with water vapor of greater than about 3 psi partial pressure at temperatures above about 500° F. The process of this invention is designed to effect redispersal of such agglomerated metal, and to achieve at least a complete recovery of fresh activity; but in nearly all cases it is found that the rejuvenated catalysts actually exhibit greater than fresh activity.

In the case of catalysts which originally contained a difficulty reducible zeolitic monovalent and/or divalent metal such as sodium, calcium, magnesium, nickel, manganese or the like, it has been found that the above described conditions encountered during use of the catalyst also appear to bring about a detrimental redistribution of the zeolitic metal cations. Residual zeolitic metal cations, particularly sodium, are believed to occupy mainly the relatively unavailable exchange sites in the hexagonal prisms and sodalite cages of the original zeolite structure, but under the described conditions of use, migration to more active cracking sites appears to occur with resultant loss in cracking activity. Divalent metal cations such as the alkaline earth metals, which may have been originally exchanged into the zeolite to achieve hydrothermal stability, may also migrate to undesirable sites. It is hence desirable in the case of these damaged catalysts to remove at least some of the zeolitic mono- and/or divalent metal cations, in addition to redistributing the non-zeolitic Group VIII noble metal hydrogenating component. These are the major objectives of the present invention.

As employed herein, the term "non-zeolitic metal" refers to the metal content of the catalyst, other than anionic lattice metals such as aluminum, which is not chemically bonded to the anionic exchange sites of the zeolite, while conversely, "zeolitic metal" refers to the metal content which is so bonded. The easily reducible metals such as the Group VIII noble metals are normally present primarily as non-zeolitic metal, as a result of previous reduction with hydrogen, oxidation and/or sulfiding treatments. The difficultly reducible metals such as the alkali and alkaline earth metals are normally present almost exclusively as zeolitic cations, since they are not affected by the usual reduction, oxidation or sulfiding treatments. Metals of intermediate reducibility such as nickel, copper and the like may be present in both zeolitic and non-zeolitic form.

In broad aspect, the rejuvenation procedure of this invention involves two basic steps. In the first step the damaged catalyst is soaked in a volumetric excess of aqueous ammonium hydroxide, with time and temperature conditions adjusted to effect the desired redistribution of the Group VIII noble metal. This restores hydrogenation activity, but does not appreciably restore lost cracking activity, unless high temperatures are employed, sufficient to exchange out some of the zeolitic metal content. At ambient temperatures, ammonium hydroxide extracts little if any zeolitic cations such as sodium or magnesium.

In the second step of the process, the catalyst is treated with extractive proportions of an aqueous ammonium salt solution under neutral or slightly acidic conditions, whereby a substantial proportion of zeolitic metals such as the alkali or alkaline earth metals are exchanged out and replaced by ammonium ions. This is believed to be the effective mechanism for restoring the cracking activity of the catalyst.

Following the first step of the process, it is necessary to strip substantially all ammonia from the catalyst in order to avoid encountering an alkaline pH in the second step; under alkaline conditions it is difficult to exchange out zeolitic metal cations with ammonium ions. The ammonia can be removed after the first step by water washing, but only with difficulty, for the acidic zeolite tends to strongly retain ammonia. An intermediate drying and calcining procedure to drive off ammonia would add greatly to the cost of the process.

To avoid these difficulties I have found it to be most expeditious to simply add sufficient acid to the ammonium hydroxide-catalyst mixture from the first step to neutralize the ammonia, thereby providing the desired ammonium salt for the second step, as well as the desired pH. This procedure also provides the fortiutous advantage of greatly reducing the amount of spent ammoniacal reagents produced, which in the past have created a serious problem of disposal in a manner consistent with environmental control standards set by governmental agencies.

A surprising aspect of the invention is that the aqueous ammonium hydroxide solution used in the first step does not extract any significant amount of the Group VIII nobel metal from the catalyst. In U.S. Pat. No. 3,899,441 to Hansford, a progenitor rejuvenation process is disclosed, which involves treating the damaged catalyst with gaseous ammonia and water vapor under controlled conditions of hydration. However, the patentee states that care should be exercised to avoid the use of excess amounts of aqueous ammonia which might tend to leach active metal out of the catalyst. It was believed at the time that the presence of excess aqueous ammonia would tend to solubilize the Group VIII noble metal as ammino-hydroxide which would then be leached out of the catalyst, an apprehension which appeared to be justified in view of publications disclosing that PdO is soluble in aqueous $NH_4OH$ (See for example McAlpine et al. *Qualitative Chemical Analysis*, D. Van Nostrand Co., Inc., 1933, page 285). It hence came as a distinct surprise to find that large excesses of aqueous ammonia could be utilized at high temperatures and for extended periods of time while extracting substantially none of the Group VIII noble metal. It would appear therefore that if a soluble species of the noble metal is formed, it is apparently so highly basic that it is retained substantially quantitatively in the acid zeolite structure even in the presence of large excesses of aqueous ammonia.

However, in using the ammonium salt solution in the second step, the conditions of temperature and contact time must be suitably controlled because it is found that, in contrast to aqueous ammonia, the ammonium salts do tend to bring about a solubilization and leaching out of the Group VIII noble metal from the catalyst.

Another progenitor of the present invention is disclosed in U.S. Pat. No. 3,692,692, involving the sequential treatment of the damaged zeolites with aqueous solutions of ammonium salts, and with ammonia under the controlled conditions of hydration disclosed in the above noted Hansford patent. The preferred techniques disclosed in said U.S. Pat. No. 3,692,692 can achieve the same basic objectives as herein; however, it is found that the use of a volumetric excess of ammonium hydroxide solution brings about a more rapid and complete recovery of hydrogenation activity than can be achieved by using the mere adsorptive proportions disclosed in said patent. The term "volumetric excess" as used herein is intended to mean a volume sufficient to at least submerge the settled catalyst bed; i.e. sufficient to saturate the catalyst particles and fill the interstitial spaces therebetween.

Another progenitor of the present invention is disclosed in my U.S. Pat. No. 3,849,293, involving the use of a single solution of ammoniacal ammonium salt solution to effect rejuvenation. It has been found however that the sequential treatment disclosed herein results in greater overall recovery of activity and ease of removal of ammonia, and with the preferred intermediate acid neutralization step, is substantially as economical as the single, mixed-solution technique.

DETAILED DESCRIPTION

A. The Aqueous Ammonium Hydroxide Treatment

The ammonium hydroxide solutions utilized herein may vary in strength over a wide range of about 0.1 to 30 percent, preferably about 0.5 to 10 percent by weight $NH_3$. The treatment may be carried out by conventional procedures which involve in general contacting the catalyst with the ammonium hydroxide solution in a single stage, in plural batch stages, or continuously by flowing a stream of the ammonia solution through a bed of the catalyst. Practical contacting temperatures range between about 20° and 100° C., preferably about 30°–90° C. By utilizing pressure vessels, higher temperatures in the range of about 100° to 200° C. may be utilized. Under these conditions, at least about 90 percent of the Group VIII noble metal is retained in the catalyst in a desirably redistributed form, with resultant improved hydrogenation activity.

The desired redistribution of noble metal takes place fairly rapidly, depending upon temperatures and $NH_3$ concentration. Practical contacting times at the preferred $NH_3$ concentrations and preferred temperatures range between above 30 minutes and 6 hours.

As noted the volume of ammonia solution employed is at least sufficient to submerge the catalyst bed; and is preferably between about 2 and 6 volumes per bulk volume of catalyst.

Following the ammonium hydroxide treatment the catalyst may be drained and water washed to remove ammonia, but as noted above such washing is difficult and time consuming, and hence it is preferred to employ an in-situ acid neutralization procedure. B. Acid Neutralization Any acid may be used in this step which will form an ammonium salt suitable for use in the subsequent ion-exchange step. Suitable acids include the conventional mineral acids, e.g. nitric, hydrochloric, sulfuric, etc., as well as organic acids such as acetic, formic, etc. A preferred acid however is carbonic acid, which is easily generated in the ammoniacal treating solution by bubbling $CO_2$ therethrough at temperatures of, e.g. 10°–50° C. The resulting salts, ammonium carbonate and/or bicarbonate, are found to be highly effective in the subsequent ion exchange step, producing very active rejuvenated catalysts.

Another advantage in using $CO_2$ is that there is no danger of damaging the catalyst as a result of local overconcentrations of acid. When strong acids are used, precautions must be taken, as by metering the acid gradually into a circulating stream of the ammonia solution, and/or providing adequate agitation in the catalyst contacting zone.

Still another advantage in using $CO_2$ is that the overall volume of treating solution need not be significantly increased. Also, the spent treating solution contains essentially only carbonate and ammonium ions, and is easily and safely disposed of.

For maximum efficiency in the subsequent ion exchange step, sufficient acid should be used to reduce the pH of the treating solution to between about 3–7, preferably about 4–6. Operation at up to about 8 pH is possible, but at considerably reduced efficiency.

C. Ammonium Salt Exchange Treatment

Following acid neutralization, ion exchange with the resulting ammonium salt solution may be carried out by conventional procedures which involve in general contacting the catalyst with the aqueous solution of ammonium salt, e.g., the carbonate, bicarbonate, nitrate, sulfate, chloride, acetate or the like. Preferred salt concentrations range between about 5% and 50% by weight. Practical contacting temperatures range between about 10° and 100° C., preferably 20°–90° C. The lower temperatures of about 20°–40° C. are preferred from the standpoint of minimizing the leaching out of Group VIII metal from the catalyst, although higher temperatures give more rapid exchange. The ion exchange efficiency is further enhanced by maintaining the exchange solution at a pH of about 3–5.5.

The contacting may be carried out in a single stage, in plural batch stages, or continuously by flowing a stream of the ammonium salt solution through a bed of the catalyst. Normally it is desirable to control the severity, or use the number of stages required, to remove at least about 25%, preferably at least about 50%, of the total zeolitic monovalent metal content. The time required to achieve this desired removal will vary widely, depending upon the contacting technique, temperatures, etc., but will generally range between about 0.5–12 hours.

In order to extract and remove zeolitic cations from the zeolite in the manner described above, it will be apparent that a sufficient volume of ammonium salt solution must be employed to provide a drainable excess, i.e. an interstitial phase thereof, over the amount required to merely fill the internal pores of the zeolite. This excess need of course be only sufficient to retain in solution at equilibrium the proportion of zeolitic cations to be removed from the zeolite. It is normally desirable to employ at least about 2 volumes of solution per volume (bulk) of catalyst.

Following the ion exchange step, the catalyst is washed to remove residual salt, and then it subjected to final drying and calcining.

D. Drying and Calcining

Following the ammonium salt treatment, it is ordinarily desirable to convert the hydrated ammonium zeolite catalyst to a dehydrated, deammoniated, oxidized form. This objective can be achieved with difficulty by a carefully controlled rapid heatup to, e.g. 950° F. in air, but to achieve maximum catalytic activity in this manner presents certain problems. The reason for this stems from the observed fact that at temperatures between about 500° and 950° F. the Group VIII noble metal on the catalyst, when in an oxidized state, tends to undergo severe agglomeration unless the water vapor partial pressure is carefully controlled. Hence, a rapid heatup in air would tend to raise the catalyst temperature to about 500° F. before some portions of the catalyst bed (or even some areas of each catalyst pellet) had been sufficiently dehydrated to permit control of localized water vapor concentrations. In general, in order to avoid agglomeration of oxidized metal on the catalyst in the 500°–950° F., temperature range, it is preferable to maintain water vapor partial pressures below about 10 psi, and preferably below 2 psi. It is therefore desirable to reduce the water content of the catalyst to a practical minimum, e.g. below about 5–10 weight-percent, at temperatures below 500° F., for at temperatures above about 500° F. the catalyst is rapidly being converted to an oxidized state with chemical evolution of water. At below about 500° F., the metal or metal oxide is not affected by water vapor.

Accordingly, for the above purposes, a preferred drying step is carried out by passing a stream of air or other non-reducing gas through a bed of the catalyst without maintaining dewpoint control over the effluent gases. It is generally preferable to start the drying at a low temperature of e.g. 100° to 200° F., and incrementally raise the stripping gas temperature to a level in the 300° to 500° F. range. The drying is preferably carried out at atmospheric pressures, or slightly elevated pressures of e.g., 50 to 100 psig.

To initiate the calcination at above 500° F. in a fixed bed of catalyst, it is preferred to start with an inert stripping gas, e.g. nitrogen, to which air is gradually added, initially in small proportions to provide an oxygen concentration of e.g., about 0.1 percent to 1 percent by volume. The temperature of the calcination gas is then gradually increased from about 500° F. to 700°–750° F. while incrementally increasing the oxygen concentration to e.g., about 0.5 percent to 2 percent. During this heatup period, water concentration in the calcination vessel should be carefully controlled, as by monitoring the effluent gases to maintain a dewpoint below about 40° F., preferably below 20° F. Inlet gas temperatures and oxygen concentrations are increased until temperatures of about 900° to 1100° F. and final oxygen concentrations in the range of about 2–20 percent are reached. When the terminal temperature and oxygen concentration are reached, the calcination is then preferably continued for a sufficient length of time to give an effluent gas stream having a dewpoint below about 0° F., preferably below about −20° F.

The gradual heatup procedure with incremental increases in oxygen concentration as described above is a practical necessity when the calcination is carried out with a deep bed of catalyst through which the calcination gases are passed. It is not intended however that the invention be limited to this procedure, for a considerably more rapid heatup at high oxygen concentrations can be utilized when the catalyst is arranged in thin layers through which the gases pass, whereby the effect of water vapor on downstream portions of the catalyst is minimized. Commercially, a rotary kiln equipped with lifters and a dry air sparger to provide good ventilation of the cascading bed of catalyst is very effective in achieving the desired results. A particularly critical period during the calcination appears to be the period of burnoff of zeolitic ammonium ions, which occurs primarily at temperatures above about 750° F. and can generate a burning wave in the catalyst wherein instantaneous temperatures and water vapor concentrations may inhibit full recovery of the original fresh catalyst activity. Accordingly, greatest care should be exercised to minimize water vapor concentrations during the 750°–1000° F. heating cycle.

E. Catalyst Compositions

Catalyst compositions which may be rejuvenated by the above procedures include hydrogenation catalysts, hydrocracking catalysts, isomerization catalysts, reforming catalysts and the like, which comprise a Group VIII noble metal supported on a siliceous zeolite base having an ion exchange capacity of at least about 0.01 meq/gm, and preferably at least about 0.1 meq/gm. Suitable siliceous zeolite bases include for example the crystalline aluminosilicate molecular sieves such as the Y, (including ultrastable Y) X, A, L, T, ZSM, and B crystal types, as well as zeolites found in nature such as for example mordenite, stilbite, heulandite, ferrierite, dachiardite, chabazite, erionite, offretite, and the like. The preferred crystalline zeolites are those having crystal pore diameters between about 7–15 A, wherein the $SiO_2/Al_2O_3$ mole ratio is about 3/1 to 10/1. For most catalytic purposes, e.g., catalytic hydrocracking, it is preferable to replace most or all of the zeolitic alkali metal cations normally associated with such zeolites with other cations, particularly hydrogen ions and/or polyvalent metal ions such as magnesium, calcium, zinc, rare earth metals and the like.

The utilitarian effect of the ammonia treatment of this invention is most evident in the case of catalysts containing significant proportions, e.g., 0.5–10 percent by weight, of zeolitic mono- and/or divalent metal ions, particularly the metals of Groups IA, IIA and IIB, e.g., sodium, potassium, calcium, magnesium, zinc, etc., as well as iron, cobalt, nickel and the like.

In addition to the crystalline zeolite bases described above, other zeolitic bases may be employed such as the zeolitic cogels of silica and alumina, silica and titania, silica and zirconia, silica and magnesia and the like.

The Group VIII noble metal hydrogenating component is ordinarily added to the zeolite base by ion exchange with an aqueous solution of a suitable compound of the desired metal wherein the metal is present in a cationic form, as described for example in U.S. Pat. No. 3,236,762. Suitable amounts may range between about 0.1 percent and 3 percent by weight. Palladium and platinum are preferred, but rhodium, ruthenium, iridium and osmium may also be employed. Other metals such as rhenium may also be included.

When catalysts of the foregoing description are utilized for extended periods of time at temperatures of, e.g., 400°–950° F. in hydrocarbon conversions such as hydrocracking, hydrogenation, isomerization, reforming and the like, a progressive decline in catalyst activity normally occurs as a result of coke deposition. A concurrent decline in activity, not attributable to coke deposition, may follow when the catalyst encounters, either during hydrocarbon conversion of during regeneration, any of the adverse conditions of temperature and water vapor partial pressure previously described. Deactivation by coking is normally almost completely reversible by conventional oxidative regeneration at temperatures of e.g., 750°–1100° F. When it is found that such oxidative regeneration restores less than about 90 percent of the fresh hydrogenation activity, and less than about 90 percent of the fresh cracking activity, it may be assumed that some undesirable maldistribution of the metal content has occurred, such as to warrant use of the rejuvenation procedure described herein. It will be understood that hydrogenation activity is measured in terms of, and is inversely proportional to, the volume of catalyst required to effect a given degree of hydrogenation per pass of a particular compound, e.g., benzene, at a particular set of hydrogenation conditions. Cracking activity can be measure in terms of the standard Cat-A cracking activity index.

The rejuvenation procedure of this invention may be carried out either before or after oxidative regeneration. In general, a more complete reactivation is obtained if the catalyst is first oxidatively regenerated and then rejuvenated, but the reverse order presents the advantage of eliminating one calcination step. The calcination required following rejuvenation can be merged into the oxidative regeneration step. The calcination conditons previously described will also result in oxidative regeneration of a coked catalyst.

The following examples are cited to illustrate the invention, but are not to be construed as limiting in scope:

EXAMPLE 1

This example illustrates a typical type of catalyst deactivation which can occur during hydrocracking. The hydrocracking run was carried out over a period of about three years, utilizing a catalyst consisting of about 0.5 weight-percent palladium supported on a Y molecular sieve cracking base having and $SiO_2/Al_2O_3$ mole ratio of about 4.7, wherein about 35% of the zeolitic ion exchange capacity was satisfied by magnesium ions, about 12% by sodium ions and the remainder by hydrogen ions. This catalyst was copelleted with about 20 weight-percent of an alumina binder, and was maintained in a sulfided condition throughout the run by virtue of a sour recycle gas containing about 0.3 volume percent of $H_2S$. The run was carried out at a pressure of about 1500 psig, with space velocities varying between about 1.3 and 1.7, hydrogen rates varying between 5000 and 7000 scf/b, and with hydrocracking temperatures progressively increasing from about 550° F. to 680° F. at end of run. The feedstock was a substantially sulfur- and nitrogen-free unconverted gas oil (400–850° F. boiling range) derived from a previous stage of hydrocracking. At the terminal temperature of 680° F. it was determined that product distribution was unfavorable and that the catalyst required regeneration.

A portion of the deactivated catalyst was carefully regenerated by oxidative combustion at temperatures ranging from about 700°–1000° F., utilizing a regeneration gas comprising oxygen in amounts increasing from about 0.1 to 3.0 volume percent, whereby water vapor partial pressure was maintained at a value below about 0.25 psi at all regeneration temperatures above 500° F.

The regenerated catalyst portion was then tested for activity compared to that of the original fresh catalyst. The feedstock used for the activity test was the same type of feed used in the previous hydrocracking run, doped with thiophene to a level of 0.48 weight-percent sulfur to provide an $H_2S$-containing atmosphere for the hydrocracking. Conditions of the activity test were: pressure 1450 psig, LHSV 1.7, hydrogen/oil ratio 8000 scf/b, conversion per pass, 52–54 volume percent to gasoline. After 100 hours on stream the regenerated catalyst required a temperature of 615° F. to maintain this conversion, compared to 557° F. for the original fresh catalyst. Thus, there was a 58° F. loss in activity not attributable to coke deposition. The following Examples 2 and 3 show that the use of a volumetric excess of aqueous ammonium hydroxide prior to oxidative regeneration is more effective for recovering activity than an analagous sequence employing only adsorptive amounts of water vapor and ammonia.

EXAMPLE 2

A portion of the coked catalyst from Example 1 was treated as follows:
(1) allowed to hydrate in ambient air to a saturation value of about 25 percent by weight of water on a hydrated basis;
(2) treated with gaseous ammonia at ambient temperatures and pressures to substantially saturate the water in the catalyst pores (about 25–30 weight-percent $NH_3$ based on water);
(3) stripped of excess ammonia by passing dry nitrogen gas through the catalyst for 16 hours;

(4) regenerated by oxidative combustion as described in Example 1.

Upon activity testing as described in Example 1, this regenerated catalyst required a temperature of 604° F. at 100 hours to maintain conversion. This is 11° F. lower than the temperature required for the regenerated catalyst of Example 1, indicating that the ammoniation treatment effected recovery of about 19% of the non-coke attributable deactivation.

EXAMPLE 3

A 200 gm sample of the coke catalyst from Example 1 was treated as follows:

(1) slurried with a solution of 200 ml of ammonium hydroxide solution (30%) and 800 ml of water for 3 hours at ambient temperature, and then drained;

(2) step (1) procedure repeated for a total of three treatments;

(3) washed free of excess ammonia, dried and regenerated as described in Example 1.

Upon activity testing as described in Example 1, a temperature of 589° F. at 100 hours was required to maintain conversion, which is 26° F. lower than the temperature required for the regenerated catalyst of Example 1. This indicates that the treatment with a volumetric excess of ammonium hydroxide effected recovery of about 46% of the non-coke-attributable deactivation. Substantially 100% of the original fresh activity is recovered if the treatment with ammonium hydroxide is followed by an ammonium salt ion exchange step, as demonstrated in the following examples.

EXAMPLE 4

A catalyst having an original composition essentially identical to that of the catalyst of Example 1 was utilized by hydrocracking service for a total of about 5 years, with one intervening regeneration and adsorptive rejuvenation of the type described in Example 2. The original 100-hour fresh activity of the catalyst was about 550° F. when tested as described in Example 1. After oxidative regeneration as described in Example 1 (following the 5 year period of use), the 100-hour activity of the catalyst was 600° F. The catalyst had thus lost 50° F. in activity not attributable to coke-deactivation.

EXAMPLE 5

A portion of the oxidatively regenerated catalyst from Example 4 was subjected to adsorptive hydration-ammoniation as follows:

(1) Allowed to hydrate in ambient air to a saturation value of about 25% by weight of water on a hydrated basis.

(2) Treated with gaseous ammonia at ambient temperatures and pressures to substantially saturate the water in the catalyst pores (about 25-30 weight-percent $NH_3$ based on water).

(3) Allowed to stand overnight in ambient air to volatilize most of the excess ammonia.

(4) Stripped and partially dried to a water content of about 6-8 weight-percent in a muffle furnace through which a stream of dry air was passed for two hours at temperatures increasing from ambient to 480° F. and then for two hours at 480° F.

(5) Calcined in the same muffle furnace while continuing the flow of dry air for one hour at temperatures increasing from 480° to 930° F., and then for one hour at 930° F.

The resulting 100-hour activity was 594° F., showing a recovery of only 6° F. in non-coke-attributable deactivation.

EXAMPLE 6

About 250 ml (185 gm) of regenerated catalyst from Example 4 was treated at 27°-30° C. for 4 hours with a solution containing 67 gms of ammonium nitrate and 40 ml of 28-30% ammonium hydroxide in 670 ml of water. The solution was continuously recirculated through the catalyst. The procedure was repeated with a second solution of the same composition, and the catalyst was then washed free of excess ammonia and ammonium nitrate, dried and calcined.

The resulting 100-hour activity was 577° F., showing a recovery of 23° F. in non-coke-attributable deactivation, as a result of the simultaneous ammonium hydroxide-ammonium salt treatment.

EXAMPLE 7

About 175 ml (130 gm) of the regenerated catalyst from Example 4 was treated at 27°-30° C. for 4 hours with a solution of 40 ml of 28-30% ammonium hydroxide in 670 ml of water. The solution was continuously recirculated through the catalyst. Then nitric acid (1 part concn $HNO_3$, 3 parts $H_2O$) was added slowly along with the recirculating stream of reagent until the pH reached about 4. With continued treatment the pH gradually rose, requiring periodic addition of acid so that the pH remained in the region of 3-6. Initially, acid additions were made at approximately 10 minute intervals. As more of the free ammonia was neutralized, the intervals at which acid additions were required in order to maintain the desired pH increased. A total of 110 ml of acid was added. After 4 hours, the treatment was terminated, the catalyst washed free of nitrate, dried and calcined.

The resulting 100-hour activity was 549° F., showing 100% recovery of the non-coke-attributable deactivation.

EXAMPLE 8

About 175 ml of the regenerated catalyst from Example 4 was treated with circulating ammonium hydroxide for 4 hours as described in Example 7. Then carbon dioxide gas was bubbled into the circulating solution. The pH gradually dropped to 6-7 over a period of about 30 minutes. The solution treatment with continuous addition of $CO_2$ was maintained for 4 hours. The catalyst was then washed free of carbonate, dried and calcined.

The resulting 100-hour activity was 539° F., which is significantly higher than the activity of the original fresh catalyst when first placed in service 5 years previously.

The following claims and their obvious equivalents are intended to define the true scope of the invention.

I claim:

1. A method for rejuvenating a catalyst comprising about 0.1-3 wt.% of a non-zeolitic Group VIII noble metal supported on a siliceous zeolite carrier having an ion exchange capacity of at least about 0.1 meq/g, and wherein at least about 50% of the original zeolitic metal content of said zeolite carrier has been replaced with hydrogen ions and/or polyvalent metal ions, but which still contains some zeolitic sodium and/or magnesium ions, said catalyst having been previously subjected to thermal and/or hydrothermal conditions resulting in a maldistribution of said Group VIII noble metal on said carrier with resultant reduction in hydrogenation activity and in a deleterious migration of said zeolitic sodium and/or magnesium cations resulting in a reduction in cracking activity, which comprises:

(A) contacting said catalyst in an oxidized or sulfided state with a volumetric excess of a reagent consisting essentially of a 0.1–30 weight-percent aqueous ammonium hydroxide solution, and correlating the contacting time with the temperature and reagent strength so as to effect a substantial improvement in hydrogenation activity of said catalyst while retaining therein at least about 90 percent of said Group VIII noble metal;

(B) exchanging out a measurable portion of said zeolitic sodium and/or magnesium ions by adding an acid component to said ammonium hydroxide solution while said solution remains in contact with said catalyst, said acid component being added in an amount such that said catalyst is contacted with an extractive proportion of an aqueous ammonium salt solution having a pH below about 8;

(C) separating the catalyst from the resulting ammonium salt extract of zeolitic metal cations; and (D) drying and calcining the separated catalyst at temperatures in the range of about 500°–950° F. while maintaining water vapor partial pressures below about 10 psi.

2. A method as defined in claim 1 wherein said Group VIII noble metal is palladium.

3. A method as defined in claim 1 wherein said siliceous zeolite carrier is a crystalline molecular sieve.

4. A method as defined in claim 3 wherein said crystalline molecular sieve is a Y zeolite, and said Group VIII noble metal is palladium.

5. A method as defined in claim 3 wherein said aqueous ammonium salt solution employed in step (B) is prepared by neutralizaing the ammonium hydroxide-catalyst mixture from step (A) with an added acid, sufficient to maintain a pH between about 3 and 7 during step (B).

6. A method as defined in claim 5 wherein said added acid is carbonic acid.

7. A method as defined in claim 5 wherein said added acid is nitric acid.

8. A method for rejuvenating a catalyst comprising about 0.1–3 wt.% of palladium supported on a Y zeolite base having an ion exchange capacity of at least about 0.1 meq/g, and wherein at least about 50% of the original zeolitic metal content of said zeolite carrier has been replaced with hydrogen ions but which still contains some zeolitic sodium ions, said catalyst having previously been utilized in a hydrocarbon conversion process to substantial deactivation and subsequently regenerated by oxidative combustion to remove carbonaceous deposits, and during said hydrocarbon conversion and/or regeneration having been subjected to thermal and/or hydrothermal conditions resulting in a reduction in hydrocarbon conversion activity not recoverable by oxidative combustion of carbonaceous deposits, which comprises:

(A) contacting said regenerated catalyst in its oxidized state with a volumetric excess of a reagent consisting essentially of a 0.1–30 weight-percent aqueous ammonium hydroxide solution, and correlating the contacting time with the temperature and reagent strength so as to effect a substantial improvement in hydrogenation activity of said catalyst while retaining therein at least about 90 percent of said palladium;

(B) exchanging out a measurable portion of said zeolitic sodium cations by adding an acid component to said ammonium hydroxide solution while said solution remains in contact with said catalyst, said acid component being added in an amount such that said catalyst is contacted with an extractive proportion of an aqueous ammonium salt solution having a pH below about 8;

(C) separating the catalyst from the resulting ammonium salt extract of zeolitic sodium cations; and (D) drying and calcining the separated catalyst at temperatures in the range of about 500°–950° F. while maintaining water vapor partial pressures below about 10 psi.

9. A method as defined in claim 8 wherein the contacting conditions in step (B) are controlled so as to extract at least about 25 percent of said zeolitic sodium ions.

10. A method as defined in claim 8 wherein said aqueous ammonium salt solution employed in step (B) is prepared by neutralizing the ammonium hydroxide-catalyst mixture from step (A) with an added acid, sufficient to maintain a pH between about 3 and 7 during step (B).

11. A method as defined in claim 10 wherein said added acid is carbonic acid.

12. A method as defined in claim 10 wherein said added acid is nitric acid.

* * * * *